United States Patent Office 2,765,401
Patented Oct. 2, 1956

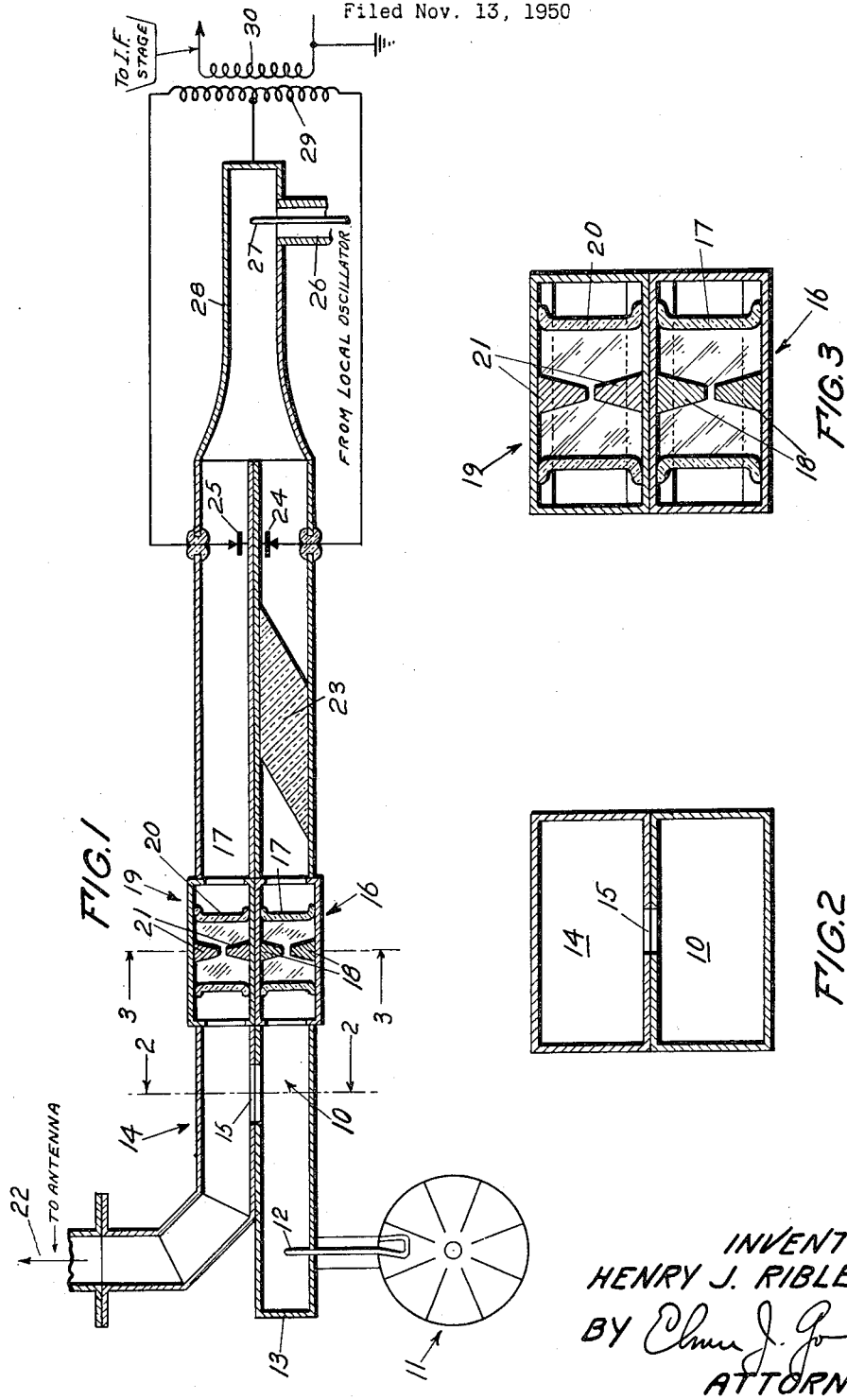

2,765,401

SIGNAL-WAVE TRANSFER DEVICES

Henry J. Riblet, Wellesley Hills, Mass., assignor to Raytheon Manufacturing Company, Newton, Mass., a corporation of Delaware Application November 13, 1950, Serial No. 195,302

8 Claims. (Cl. 250—13)

This invention relates to signal-wave transfer devices, and more particulary to signal-wave transfer devices which are adapted for use in transmit-receive devices, such as pulse-echo radar units. It is well known that pulse-echo radar units may be made to work with the transmitter and a receiver on a single antenna by the use of switching devices which alternately transfer the antenna from the transmitter to the receiver.

This invention discloses a particular structure adapted to switch the antenna from the transmitter to the receiver, and is especially useful with receivers which use a balanced detector.

Briefly, the invention comprises a pair of signal-wave transfer channels, such as wave guides, which are coupled together by a hybrid junction. One of the channels is connected to the signal source, such as an oscillation generator, and the other channel is connected to an antenna.

By the use of suitable switching means such as, for example, gaseous-discharge devices in the wave guides, the energy from the oscillation generator is caused to pass through the hybrid junction to the antenna and is isolated from the detector of the receiving apparatus through the action of the switching means.

When the period of oscillation generation by the transmitter is over, the switching means is deenergized, and signals returning from the antenna through the wave guide connected thereto are divided equally by the hybrid junction and pass through the switching means to the balanced detector. A delay is introduced in one of the guides before the signal reaches the balanced detector such that the signals in the two channels are one hundred and eighty degrees out of phase when they reach the balanced detector.

A suitable local oscillator may be used to feed the balanced detector to produce a heterodyning action in the well-known manner. The result is a simple and inexpensive transmit-receive system having the desirable wide frequency response characteristics inherent with balanced detectors.

Other objects and advantages of the invention will be apparent as the description thereof progresses, reference being had to the accompanying drawing, wherein:

Fig. 1 illustrates a longitudinal, cross-sectional view of a wave-guide structure embodying this invention;

Fig. 2 illustrates a transverse, cross-sectional view of the hybrid section of the wave-guide structure, taken along line 2—2 of Fig. 1; and Fig. 3 illustrates a transverse, cross-sectional view of the gaseous-discharge switching structure embodied in the wave-guide structure of Fig. 1.

Referring now to Figs. 1 through 3, there is shown a first wave guide 10 having a source of electrical oscillations, such as a magnetron 11, coupled thereto by a probe 12 extending into guide 10 near one end thereof. Guide 10 has the end thereof, near which the probe 12 enters the guide, closed by an end plate 13, the distance of probe 12 from end plate 13 being governed by considerations of impedance match between the magnetron 11 and the guide 10 in accordance with well-known principles.

A second guide 14 is positioned on top of the first guide 10 with the axes of the two guides substantially parallel, and the wide upper wall of guide 10 adjacent the wide lower wall of guide 14. A common slot 15 is cut in the adjacent walls of guides 14 and 10, the axis of said slot lying in the plane of the axes of guides 10 and 14, and the length and width of said slot being determined by the dimensions of the guides 10 and 14 and the frequency used, and being dimensioned such that said slot will act as a hybrid junction between guides 10 and 14.

When acting as a hybrid junction, the slot 15 will couple substantially half the power from one guide into the other guide and propagate it in substantially the same direction as it was propagated in the original guide, thus producing a directional coupling action. This type of slotted coupler is described in greater detail in the book "Technique of Microwave Measurements" by Carol G. Montgomery, volume 11 of the Radiation Laboratory Series, published by the McGraw-Hill Book Company, Inc., 1947, Sec. 14.8.

In guide 10, on the opposite side of slot 15 from probe 12 is a switching device 16, shown here by way of example as a gaseous-discharge device comprising a glass envelope 17 filled with a gas and having therein a pair of probes 18 which extend from the opposite wide walls of the guide 10 toward the center thereof, adjacent ends of probes 18 having a small gap therebetween.

When the magnetron 11 fires, energy attempting to travel down the guide 10 past slot 15 causes the gap between the probes 18 to break down, thus producing effectively a short circuit across guide 10 at this point. The resultant mismatch of the guide at this point causes substantially complete reflection of the oscillations from this point. By adjustment of the distance between the slot 15 and the probes 18, substantially all the power generated by the magnetron 11 may be made to pass through slot 15.

A second switching tube 19 is positioned in guide 14 substantially above switching tube 16, and having a gas-filled envelope 20 and probes 21 similar to those of switching tube 16. Switching tube 19 in guide 14 prevents energy which passes through the slot 15 from being propagated in the guide beyond said switching tube, and, as a result, the energy is substantially all propagated from the magnetron 11 through the slot 15 and out the guide 14 in a direction which feeds to the antenna, as illustrated by the arrow 22. After the magnetron 11 has finished generating a pulse of microwave energy, and said energy has passed out to the antenna, the gaseous-switching tubes 16 and 19 cease discharging.

Echo signals, which are now picked up from the antenna from reflections of the transmitted-pulse signal, pass down the wave guide 14 and are substantially divided by the action of slot 15 so that substantially half the energy is propagated in guide 10 and half in guide 14. This energy passes through the switching tubes 16 and 19 since said energy is of sufficiently low level not to discharge said switching devices. The action of slot 15 in coupling energy from guide 14 to guide 10 will delay the energy propagated in guide 10 substantially ninety degrees behind the energy propagated in guide 14.

A wave-slowing structure 23, shown here by way of example as a tapered block of plastic, such as polystyrene, filling a portion of the wave guide 10, is used to delay the signal in guide 10 by substantially another ninety degrees such that the signal propagated in guide 10 is substantially one hundred and eighty degrees out of phase with the signal propagated in guide 14. The signals in guides 10 and 14 then impinge upon a pair of detectors 24 and 25 in guides 10 and 14, respectively, said detectors being shown here, by way of example, as crystals.

A signal from a local oscillator is fed by a section of a coaxial line 26 and an excitation probe 27 into a section of wave guide 28 which is tapered outwardly to encompass the ends of the two wave guides 10 and 14 adjacent the detectors 24 and 25, thus feeding a local oscillator signal of substantially the same phase and magnitude to both guides. The detectors 24 and 25 are connected, respectively, from the wave guide to opposite ends of a transformer primary winding 29, the center tap of which is connected back to the wave guide. A secondary winding 30 coupled to primary winding 29 then feeds the signal from detectors 24 and 25 to an I. F. stage.

This completes the description of the particular embodiment of the invention illustrated herein. However, many modifications will be apparent to persons skilled in the art without departing from the spirit and scope of this invention. For example, any desired type of gaseous-switching device could be used. Indeed, said device need not be placed in the wave guide, but could be adjacent thereto with the desired coupling to produce the impedance mismatch in the guide upon firing of the switching device.

Furthermore the system is not necessarily limited to pulse-echo radar applications, but could be used, for example, in two-way communication systems. In addition, the system need not necessarily be used in conjunction with the balanced detector, and other methods could be used for introducing the local oscillator signal into the wave-guide structure. Therefore, it is desired that this invention be not limited by the particular details described herein, except as defined by the appended claims.

What is claimed is:

1. A signal-wave transfer device comprising a pair of signal channels, a hybrid junction connecting said signal channels for coupling signals therebetween, switching means in said channels for controlling the flow of signals in said channels, and a balanced detector fed by said signal channels directly through said switching means.

2. A signal-wave transfer device comprising a pair of signal channels, a hybrid junction connecting said signal channels for coupling signals therebetween, substantially short circuit switching means in said channels for controlling the flow of signals in said channels, and a balanced detector fed by said signal channels directly through said switching means, said detector comprising a separate detecting element coupled respectively to each of said signal channels.

3. A signal-wave transfer device comprising a pair of signal channels, a hybrid junction connecting said signal channels for coupling signals therebetween, substantially short circuit switching means in said channels for controlling the flow of signals in said channels, and a detector fed by said signal channels directly through said switching means, the wave length distance between said junction and said detector along one of said channels being substantially different from the corresponding electrical distance along the other of said channels.

4. A signal-wave transfer device comprising a pair of wave guides, a hybrid junction connecting said wave guides for coupling signals therebetween, a first detector directly fed by one of said wave guides, a second detector directly fed by the other of said wave guides, and switching means in said guides for substantially short circuiting said guides at said switching means and thereby isolating said guides from said detectors.

5. A signal-wave transfer device comprising a pair of wave guides, a hybrid junction connecting said wave guides for coupling signals therebetween, balanced detecting means directly coupled to both of said wave guides, and switching means in said guides for substantially short circuiting said guides at said switching means and thereby isolating said guides from said detecting means.

6. A signal-wave transfer device comprising a pair of wave guides, a hybrid junction connecting said wave guides for coupling signals therebetween, detecting means directly fed by said wave guides, the wave length distance between said junction and said detecting means along one of said guides being substantially different from the corresponding electrical distance along the other of said guides, and switching means in said guides for substantially short circuiting said guides at said switching means and thereby isolating said guides from said detecting means.

7. A signal-wave transfer device comprising a pair of wave guides, a hybrid junction connecting said wave guides for coupling signals therebetween, detecting means directly fed by said wave guides, the wave length distance between said junction and said detecting means along one of said guides being different from the corresponding wave length distance along the other of said guides by substantially a quarter wave length at the signal frequency, and switching means in said guides for substantially short circuiting said guides at said switching means and thereby isolating said guides from said detecting means.

8. In a pulse echo-distance measuring system, a pair of waveguides, a hybrid junction connecting said waveguides, short-circuiting switches in said waveguides spaced from said junction, a source of periodic oscillations coupled to one of said waveguides on the same side of the switch in said waveguide as said junction, a transmission line for connecting the other of said waveguides to an energy radiator coupled to the other of said waveguides on the same side of the switch in said waveguide as said junction, and a balanced detection system directly coupled to both of said waveguides on the opposite side of said switches from said junction.

References Cited in the file of this patent
UNITED STATES PATENTS

| | | |
|---|---|---|
| 2,445,896 | Tyrrell | July 27, 1948 |
| 2,475,474 | Bruck et al. | July 5, 1949 |
| 2,497,092 | Moore | Feb. 14, 1950 |
| 2,550,409 | Fernsler | Apr. 24, 1951 |
| 2,550,524 | Braden | Apr. 24, 1951 |
| 2,593,120 | Dicke | Apr. 15, 1952 |
| 2,602,835 | Hershberger | July 8, 1952 |

OTHER REFERENCES

Proceedings I. R. E., November 1947, pages 1294–1306, Hybrid Circuits for Microwaves by W. A. Tyrrell.